United States Patent [19]

Bikson et al.

[11] Patent Number: 5,348,569
[45] Date of Patent: Sep. 20, 1994

US005348569A

[54] MODIFIED POLY(PHENYLENE OXIDE) BASED MEMBRANES FOR ENHANCED FLUID SEPARATION

[75] Inventors: Benjamin Bikson; Gertrud Gotz, both of Brookline, Mass.; Yurdagul Ozcayir, Nashua, N.H.; Joyce K. Nelson, Lexington, Mass.

[73] Assignee: Praxair Technology, Inc., Danbury, Conn.

[21] Appl. No.: 83,594

[22] Filed: Jun. 30, 1993

[51] Int. Cl.$^5$ ................. B01D 53/22; B01D 69/12
[52] U.S. Cl. ........................... 95/45; 95/51; 95/53; 95/54; 95/55; 96/13
[58] Field of Search ............... 95/45, 51, 53–55; 96/4, 11–13; 55/DIG. 5

[56] References Cited

U.S. PATENT DOCUMENTS

| | | | |
|---|---|---|---|
| 3,219,698 | 11/1965 | Halpern et al. | 260/576.6 |
| 3,259,592 | 7/1966 | Fox et al. | 260/2.2 |
| 3,306,874 | 2/1967 | Hay | 260/47 |
| 3,306,875 | 2/1967 | Hay | 260/47 |
| 3,350,844 | 11/1967 | Robb | 55/16 |
| 3,510,387 | 5/1970 | Robb | 161/112 |
| 3,551,244 | 12/1970 | Forester et al. | 156/244 |
| 3,631,130 | 12/1971 | Klebe | 260/0.2 |
| 3,677,976 | 7/1972 | Miller et al. | 260/2 |
| 3,709,841 | 10/1972 | Quentin | 210/23 |
| 3,733,307 | 5/1973 | Cooper | 260/61 |
| 3,735,559 | 5/1973 | Salemme | 55/16 |
| 3,780,496 | 12/1973 | Wald, III et al. | 55/16 |
| 3,855,122 | 12/1974 | Bourganel | 210/23 |
| 3,875,096 | 4/1975 | Graefe et al. | 260/29.2 |
| 3,980,456 | 9/1976 | Browall | 55/158 |
| 4,035,337 | 7/1977 | Cooper et al. | 260/47 |
| 4,073,724 | 2/1976 | Chapurlat | 210/23 H |
| 4,155,793 | 5/1979 | Salemme et al. | 156/246 |
| 4,192,842 | 3/1980 | Kimura et al. | 264/298 |
| 4,427,419 | 1/1984 | Li | 95/51 |
| 4,467,001 | 8/1984 | Coplan et al. | 427/434.6 |
| 4,468,501 | 8/1984 | Zampini et al. | 55/158 |
| 4,468,502 | 8/1984 | Malon et al. | 55/158 |
| 4,521,224 | 6/1985 | Li | 95/51 X |
| 4,530,703 | 7/1985 | Malon et al. | 95/45 |
| 4,551,156 | 11/1985 | Li | 95/51 X |
| 4,586,939 | 5/1986 | Li | 95/51 X |
| 4,602,922 | 7/1986 | Cabasso et al. | 55/158 |
| 4,626,585 | 12/1986 | Bartmann et al. | 528/212 |

(List continued on next page.)

FOREIGN PATENT DOCUMENTS

| | | | |
|---|---|---|---|
| 1197196 | 11/1985 | Canada | 95/51 |
| 263672 | 8/1989 | Czechoslovakia | D01F 6/66 |
| 0099187 | 1/1984 | European Pat. Off. | 96/13 |
| 0181850 | 5/1986 | European Pat. Off. | B01D 13/04 |
| 0277834 | 8/1988 | European Pat. Off. | B01D 13/04 |
| 0298531 | 1/1989 | European Pat. Off. | B01D 13/04 |
| 0394505 | 10/1990 | European Pat. Off. | B01D 69/04 |
| 0404416 | 12/1990 | European Pat. Off. | B01D 69/14 |
| 100917 | 5/1988 | Japan | B01D 53/22 |
| 137703 | 6/1988 | Japan | B01D 13/00 |
| 264102 | 11/1988 | Japan | B01D 13/00 |
| 305904 | 12/1988 | Japan | B01D 13/04 |

OTHER PUBLICATIONS

Journal of Membrane Science, vol. 64, "Formation of Asymmetric Hollow Fiber Membranes for Gas Separation," by Smid et al, pp. 121–127, 1991.

(List continued on next page.)

*Primary Examiner*—Robert Spitzer
*Attorney, Agent, or Firm*—Chung K. Pak

[57] ABSTRACT

The present invention relates to composite membranes and membranes which are formed from modified poly(-phenylene oxide) polymers having improved film forming properties and separation characteristics. The present invention further relates to poly(phenylene oxide) polymer and modified poly(phenylene oxide) polymer, having improved membrane forming characteristics and processes for producing the same.

30 Claims, No Drawings

U.S. PATENT DOCUMENTS

| | | | |
|---|---|---|---|
| 4,650,501 | 3/1987 | Hiscock et al. | 55/26 |
| 4,673,717 | 6/1987 | Percec et al. | 525/390 |
| 4,684,376 | 8/1987 | Percec et al. | 95/51 X |
| 4,686,131 | 8/1987 | Sugio et al. | 55/158 |
| 4,717,395 | 11/1988 | Chiad | 55/16 |
| 4,767,422 | 8/1988 | Bikson et al. | 55/16 |
| 4,818,387 | 4/1989 | Ikeda et al. | 55/158 |
| 4,866,099 | 9/1989 | Hendy | 210/650 |
| 4,880,440 | 11/1989 | Perrin | 55/16 |
| 4,909,810 | 3/1990 | Nakao et al. | 55/16 |
| 4,920,193 | 4/1990 | Han et al. | 528/171 |
| 4,944,775 | 7/1990 | Hayes | 95/54 X |
| 4,950,314 | 8/1990 | Yamada et al. | 55/158 |
| 4,954,143 | 9/1990 | Scott et al. | 55/158 |
| 4,971,695 | 11/1990 | Kauaka Mi et al. | 55/158 |
| 4,981,498 | 11/1991 | Bikson et al. | 55/16 |
| 4,990,165 | 2/1991 | Bikson et al. | 55/158 |
| 5,002,590 | 3/1991 | Friesen et al. | 55/16 |
| 5,009,678 | 4/1991 | Bikson et al. | 55/16 |
| 5,026,479 | 6/1991 | Bikson et al. | 210/321.8 |

OTHER PUBLICATIONS

Chemical Abstract No. 236575Y, vol. 112, No. 14 "Hollow Poly (Phenylene Oxide) Fibers and Process for Manufacturing Them," by Pechocova et al, p. 7, 1990.

Ind. Eng. Chem. Res., vol. 28, No. 6, 1989 "Analysis and Construction of Multilayer Composite Membranes to the Separation of Gas Mixture," by Kevin A. Lundy et al. (Reprinted from ISEC Research 1989. 28. 742).

Journal of Applied Polymer Science, vol. 20 (1976) "Sulfonated Polysulfone" by A. Noshay et al, pp. 1885–1903.

George Odian, "Principles of Polymerization," 2nd Edition, A. Wiley–Interscience Publication, John Wiley & Sons, pp. 22–23.

Journal of Applied Polymer Science, vol. 29, p. 4029, 1984.

"Research and Development of NS–1 and Related Polysulfone Hollow Fibers for Reverse Osmosis Desalination of Sea Water," PB 248, 666; the Office Water Research and Technology Contract No. 14–30–3165, U.S. Dept. of the Interior, 1975.

"Research on Advanced Membranes for Reverse Osmosis," an annual report to the Office of Saline Water, U.S. Dept. of the Interior, Contract No. 14–30–2999, 1973.

Research and Development Progress Report No. 697, Contract No. 14–30–2627 to the U.S. Dept. of Interior, "Development of Polyphenylene Oxide Membranes," by Chludzinski et al, Jun. 1971.

Psaiination vol. 36, (1981), "Asymetric Reverse Osmosis and Ultrafiltration Membranes Prepared from Sulfonated Poly Sulfone," by Friedrich et al, pp. 39–62.

Journal of Applied Polymer Science, vol. 23, pp. 1509–1503, 1979.

"Research on In Situ–Formed Condensation Polymer for Reverse Osmosis Membranes," Final Report to the Office of Water Research and Technology, U.S. Dept. of the Interior, Contract No. 14–34–001–6521, 1978.

"Development of a Composite Reverse Osmosis Membrane for Single Pass Sea Water Desalination," Final Report to the office of Water Research Technology, U.S. Dept. of the Interior, Contract No. 14–3–4–0001.7541, 1979.

MODIFIED POLY(PHENYLENE OXIDE) BASED MEMBRANES FOR ENHANCED FLUID SEPARATION

FIELD OF THE INVENTION

The present invention relates to composite membranes and membranes which are formed from modified poly(phenylene oxide) polymers having improved film forming properties and separation characteristics. The present invention further relates to poly(phenylene oxide) polymer and modified poly(phenylene oxide) polymer, having improved membrane forming characteristics, and processes for producing the same.

BACKGROUND OF THE INVENTION

Various permeable or semipermeable membranes are known to be used in a variety of fluid separations. These membranes can offer, inter alia, significant cost savings over other fluid separation means, such as adsorption and distillation means. The effectiveness of the membranes in fluid separation, however, is highly dependent on the permeability and selectivity of the membranes. As the increased permeability requirement in the recent years has resulted in the movement of membrane art in the direction of reducing the thickness of membranes, the strength and film forming characteristics of membrane materials have also become increasingly important. The strength and film forming characteristics play an important role in producing very thin membranes.

At the present time, fluid separation membranes are known to be made from a wide variety of polymeric materials. Of these polymeric materials, poly(phenylene oxide) polymer or chemically modified poly(phenylene oxide) polymer, such as sulfonated poly(phenylene oxide), is most attractive as a membrane forming material because of the good combination of permeation and separation characteristics of these materials and because of the ready availability of poly(phenylene oxide) polymer. Indeed, such desirability of poly(phenylene oxide) based polymer materials has led to the development of a variety of poly(phenylene oxide) polymer based membranes.

Chemical Abstract No. 236575Y, volume 112, "Hollow Poly(phenylene oxide) Fibers and Process for Manufacturing Them" by M. Pechocova et al, Czech. CS 263,672, shows an asymmetric membrane, i.e., hollow fibers, useful for reverse osmosis, micro- and ultra-filtration, dialysis and other separation processes. The asymmetric membrane is prepared by spinning a solution containing poly(2,6-dimethyl-1,4-phenylene oxide) polymer or sulfonated poly(2,6-dimethyl-1,4-phenylene oxide) polymer having a molecular weight equal to or greater than 74,000 through a spinneret with ring-shaped holes.

J. Smid et al. in the Journal of Membrane Science, Vol 64, p. 121-129, 1991, "The Formation of Asymmetric Hollow Fiber Membranes for Gas Separation, Using PPE of Different Intrinsic Viscosities" disclose asymmetric hollow fiber membranes prepared by using a range of intrinsic viscosities of poly (2,6-dimethyl-1,4-phenylene oxide). The use of high intrinsic viscosity poly (2,6-dimethyl-1,4-phenylene oxide) polymer is indicated to be helpful in preparing asymmetric membranes, i.e., hollow fibers, with improved properties.

U.S Pat. No. 3,259,592 discloses resins and membranes made from sulfonated poly(phenylene oxide) polymer. The sulfonated poly(phenylene oxide) polymers disclosed are produced by a sulfonation process that is substantially heterogeneous in nature. The sulfonated polymer precipitates instantaneously on the addition of the sulfonating agent, $HClSO_3$, to the solution containing precursor poly(phenylene oxide) polymer in a halogenated solvent, and the sulfonation is completed by the further addition of the sulfonating agent to the slurry of the partially sulfonated product.

Preparation of sulfonated poly(phenylene oxide) membranes for reverse osmosis applications is described in Research and Development Progress Report No. 697, Contract No. 14-30-2627 to the U.S. Dept. of Interior, entitled "Development of Poly(phenylene oxide) Membranes" by Chludzinski et al., 1971. Commercial poly(phenylene oxide) polymer that had an intrinsic viscosity of about 0.45 dl/g was utilized to prepare sulfonated polymeric membrane forming materials.

The commercial application of modified poly(phenylene oxide) based membranes, however, is frequently hindered by their limited separation characteristics and/or strength in fluid separations, more particularly in gas separation applications. Often, the membranes produced are fragile, brittle and prone to defects. Commercial membranes normally could not be produced with consistent properties.

Therefore, there is a genuine need and desire in the art for modified poly(phenylene oxide) polymer based membranes having enhanced selectivity, permeability and strength, which are capable of being used in commercial fluid separation operations, more particularly in commercial gas separation operations. Moreover, it is desirable to determine better ways to produce modified poly(phenylene oxide) polymer based membrane materials having the desired consistent properties, i.e., permeability, selectivity, strength and film forming characteristics.

SUMMARY OF THE INVENTION

According to one embodiment of the present invention, the above need is met by forming a composite membrane comprised of a layer or coating of at least one modified poly(phenylene oxide) polymer on a porous substrate, said modified poly(phenylene oxide) polymer defined as having a chemical structure with at least about 10% of the recurring unit of:

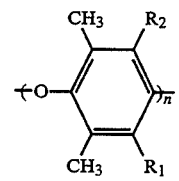

wherein: $R_1$ and $R_2$ are selected from the group consisting of H, $SO_3H$, $SO_3M$, sulfonyl $SO_2R_3$, sulfonamide $SO_2N(R_3)_2$, carbonyl $COR_3$ and amide $CONHR_3$, with $R_3$ being a $C_1$ to $C_4$ aliphatic radical or aryl radical, and M being alkaline metal, alkaline earth metal, transition metal, $NH_4^+$ or organic base, provided that at least one of $R_1$ and $R_2$ is not H. This modified poly(phenylene oxide) polymer is prepared by chemically modifying poly(phenylene oxide) precursor having a number average molecular weight above 25,000 and preferably is free of or substantially free of any trace amount of polymerization catalysts. Desirably, the poly(phenylene oxide) polymer precursor having the above characteristic is produced by a purification process. The process comprises:

(a) bringing commercially available poly(phenylene oxide) polymer in contact with a hot solvent having a solubility parameter value of about 9.1 $[cal/cm^3]^{\frac{1}{2}}$ to about 9.7 $[cal/cm^3]^{\frac{1}{2}}$ to form a slurry;

(b) filtering said slurry to recover poly(phenylene oxide) polymer in solid form and to remove low molecular weight fractions and catalytic impurities thereof as the filtrate; and (c) washing the resulting solid poly(phenylene oxide) polymer with an inert solvent to further remove the low molecular weight fractions and catalytic impurities present therein.

According to another embodiment of the present invention, the above stated need is met by forming a membrane with sulfonated poly(phenylene oxide) polymer that has substantially more homogeneous distribution of sulfonated sites. The substantially homogeneously sulfonated poly(phenylene oxide) polymer is produced by a process comprising:

(a) dissolving poly(phenylene oxide) polymer in an inert solvent to form a solution;

(b) adding a sulfonating agent to the solution at a temperature sufficient to avoid any significant sulfonation reaction to form a substantially homogenous reaction mixture;

(c) raising the temperature of said substantially homogeneous reaction mixture to cause sulfonation of poly(phenylene oxide) polymer; and (d) recovering the resulting sulfonated poly(phenylene oxide) polymer.

The sulfonated poly(phenylene oxide) is preferably neutralized with at least one of alkaline metals, alkaline earth metals, transition metals, $NH_4^+$ or organic bases. The salified sulfonated poly(phenylene oxide) is preferably further purified to remove residual salts and low molecular weight impurities prior to use as a membrane forming material. The substantially homogeneously sulfonated poly(phenylene oxide) polymer can be advantageously prepared from poly(phenylene oxide) polymer having a number average molecular weight above 25,000 with essentially no residue of polymerization catalysts. The resulting high molecular weight sulfonated poly(phenylene oxide) polymer is preferably neutralized with alkaline metals, alkaline earth metals, transition metals, and/or organic base.

As used herein, the term "any significant sulfonation reaction" means that no precipitation or substantially no precipitation occurs until 70 percent, preferably 90 percent, and most preferably 100 percent of the overall required amount of the sulfonating agent is added to the reaction mixture.

As used herein, the term "a substantially homogeneous reaction mixture" means that a mixture (solution) is substantially free of any precipitates after at least 70 percent, preferably 90 percent, and most preferably 100 percent, of the required amount of the sulfonation agent is added to the reaction mixture.

As used herein, the term "inert solvent" means that a solvent is not chemically reactive with the sulfonation agent, poly(phenylene oxide) polymer, and sulfonated poly(phenylene oxide) polymer.

DETAILED DESCRIPTION OF THE INVENTION

One aspect of the invention lies in recognizing the importance of using modified poly(phenylene oxide) polymer having certain characteristics or properties to form composite membranes. The certain characteristics or properties of the modified poly(phenylene oxide) polymer, which comprise a particular molecular weight requirement, a particular ion exchange capacity and a particular intrinsic viscosity with essentially no polymerization catalyst impurities are found to be exceptionally suitable for forming composite membranes. The composite membranes of the present invention are found to be less susceptible to defects and found to exhibit enhanced separation characteristics, i.e., permeability and selectivity.

Another aspect of the invention lies in preparing sulfonated poly(phenylene oxide) polymer in a particular manner, i.e., homogeneously, to improve materials membrane forming characteristics. This sulfonated poly(phenylene oxide) polymer is prepared from a substantially homogeneous reaction mixture containing a sulfonating agent and poly(phenylene oxide) polymer. The sulfonated poly(phenylene oxide) polymer is preferably further neutralized and further purified prior to use. Advantageously, poly(phenylene oxide) polymer of high molecular weight and a narrow molecular weight distribution is used as a precursor to prepare sulfonated poly(phenylene oxide) polymers and composite membranes therefrom. The resulting sulfonated poly(phenylene oxide) polymer exhibits improved film forming characteristics and solubility in such solvents as low aliphatic alcohols, e.g., methanol and/or ethanol, thus facilitating the formation of membranes, preferably composite membranes, having consistent properties and improved strength.

In preparing modified poly(phenylene oxide) polymers of this invention, including homogeneously sulfonated poly(phenylene oxide) polymer, it is preferable to utilize poly(phenylene oxide) precursor with a high molecular weight, a high intrinsic viscosity and a narrow molecular weight distribution. Namely, poly(phenylene oxide) precursor should have a number average molecular weight of above 25,000, preferably above 30,000, and most preferably above 35,000, and an intrinsic viscosity greater than 0.5 dl/g, preferably greater than about 0.52 dl/g, most preferably greater than about 0.55 dl/g when measured in chloroform at 25° C. These high number average molecular weights and intrinsic viscosities are generally preferred because they impart enhanced separation properties or characteristics to the resulting composite membranes. The number average molecular weight and intrinsic viscosity, however, must not be unduly high to cause difficulties in using the modified poly(phenylene oxide) polymer in a casting solution. The ratio of weight average molecular weight to number average molecular weight is preferably low, preferably below 3, most preferably below 2. By lowering the ratio, the molecular weight distribution of the modified poly(phenylene oxide) polymer can be substantially narrowed, thereby further improving the resulting composite membranes. The polymer preferably should also be free or substantially free of polymerization catalyst and low molecular weight fractions.

The poly(phenylene oxide) polymer or precursor having the above properties or characteristics can be prepared through various known methods. These known methods, however, must be adjusted to produce the desired polymer. The poly(phenylene oxide) polymer or precursor, for example, can be prepared by oxidative coupling polymerization of 2,6-dimethyl substituted phenol in the presence of copper-amine complexes and oxygen as described in U.S. Pat. Nos. 3,306,874; 3,306,875; and 4,626,585, which are herein incorporated by reference. The desired high molecular weight poly(phenylene oxide) polymer or precursor, can be selectively produced upon adjusting the amount of oxygen absorbed and/or the ratio of the phenol to the copper amine complex.

The desired poly(phenylene oxide) precursor also can be obtained by purifying commercially available poly(phenylene oxide) polymer. The commercially available poly(phenylene oxide) polymer ordinarily contains a significant amount of a low molecular weight fraction having a molecular weight below 10,000 and residual polymerization catalyst impurities. Typically, it has an intrinsic viscosity of about 0.45 to about 0.49 dl/g, a number average molecular weight below 20,000 and a weight average molecular weight below 60,000. Such commercial poly(phenylene oxide) polymer may be purified by washing with inorganic acid or base water solution, by fractional precipitation or other methods known in the art as long as purification conditions are selective in recovering poly(phenylene oxide) polymer or precursor of a number average molecular weight above 25,000.

It has been found, further, that commercial poly(phenylene oxide) polymer can be most effectively purified via extraction with solvents having a solubility parameter value of between about 9.1 and about 9.7 $[cal/cm^3]^{\frac{1}{2}}$, preferably between about 9.2 and about 9.4 $[cal/cm^3]^{\frac{1}{2}}$. These solvents should not dissolve the poly(phenylene oxide) polymer during the extraction. The preferred solvents, which are found to be particularly useful, are hot aliphatic ketones, such as methyl ethyl ketone and acetone, and ethers, such as ethylene glycol dimethyl ether (monoglyme). The commercial poly(phenylene oxide) polymer in fine powder form, for example, is initially mixed with substantial excess of methyl ethyl ketone. The resulting mixture is then brought to 70° C., preferably refluxed and filtered. During the filtration, the temperature of the mixture is normally maintained at about 70° C. or higher to prevent premature precipitation of extracted impurities. The above procedure may be repeated. After repeating the procedure, the recovered solid polymer may be further washed with hot solvent in a filtering means until the filtrate is clear in color (not yellow in color). The clear color of the filtrate frequently indicates that the commercial poly(phenylene oxide) polymer is free of impurities.

The poly(phenylene oxide) polymer having the above desired properties or characteristics may not be required if the modified poly(phenylene oxide) polymer is purified, after modification reaction, to remove low molecular weight fractions and polymerization catalyst impurities prior to use in preparation of composite membranes. The purification of the modified poly(phenylene oxide) polymer, for instance, may be carried out using known purification techniques, such as ultrafiltration, diafiltration and/or dialysis, as long as the techniques involved are adjusted to remove low molecular weight fractions below about 5,000, preferably below about 10,000. In carrying out the above purification techniques, the modified poly(phenylene oxide) polymer is usually dissolved in a solvent prior to being subjected to, for example, ultrafiltration, diafiltration and/or dialysis. Solvents containing alcohols (ethanol, methanol, etc.), alcohol/water mixture and water were found to be particularly effective in purifying sulfonated poly (phenylene oxides).

As used herein, the term "modified poly(phenylene oxide) polymer" means chemically modified poly(phenylene oxide) polymer defined as having the polymeric backbone modified to contain at least 10% of the recurring unit of:

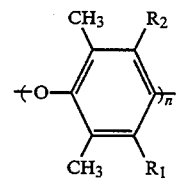

wherein: $R_1$ and $R_2$ are selected from the group consisting of H, $SO_3H$, $SO_3M$, sulfonyl $SO_2R_3$, sulfonamide $SO_2N(R_3)_2$, carbonyl $COR_3$ and amide $CONHR_3$, with $R_3$ being a $C_1$ to $C_4$ aliphatic radical or aryl radical, and M being alkaline metal, alkaline earth metal, transition metal, $NH_4^+$ or organic base, provided that at least one of $R_1$ and $R_2$ is not H.

The above modified poly(phenylene oxide) polymer may be prepared by methods well known in the art, for example, as described in U.S. Pat. Nos. 3,259,592; 3,780,496; and 4,673,717, incorporated herein by reference, as long as the poly(phenylene oxide) polymer having the desired properties or characteristics, such as purified poly(phenylene oxide) polymer, is employed in the preparation. It is understood that a variety of known modifying agents can be used for preparing particular modified poly(phenylene oxide) polymer. Sulfonated poly(phenylene oxide) polymer, for example, can be prepared by using various sulfonation agents including chlorosulfonic acid, sulfur trioxide and sulfur trioxide complexes. The ion exchange capacity (IEC) of the sulfonated poly(phenylene oxide) polymer is normally maintained at about 1.9 to about 3.2 milliequivalents/g of dry polymer in $H^+$ form since such ion exchange capacity is found to be most suitable for forming composite membranes with optimal fluid separation characteristics.

Of various modified poly(phenylene oxide) polymers, sulfonated poly(phenylene oxide) polymers are found to be most suitable for membrane preparation. Sulfonated poly(phenylene oxide) polymer is found to be most effective, especially if it is prepared by a substantially homogeneous sulfonation process. The substantially homogeneous preparation generally involves dissolving poly(phenylene oxide) polymer in an inert solvent, adding a sulfonation agent to the inert solvent containing the dissolved poly(phenylene oxide) polymer at a temperature low enough to prevent any significant sulfonation, thoroughly mixing the reactants to form a substantially homogeneous mixture and causing the sulfonation of poly(phenylene oxide) polymer by raising the temperature of the mixture. Chloroform or other halogenated solvents can be utilized as inert solvents. The preferred sulfonation agent is chlorosulfonic acid. When chlorosulfonic acid is used as the sulfonation agent, the temperature of the inert solvent is maintained at about $-20°$ C. or below during the addition and mixing of chlorosulfonic acid. Subsequently, the temperature of the reaction mixture is raised to about 0° to 25° C. to affect sulfonation and cause rapid precipitation of sulfonated poly(phenylene oxide) polymer from the reaction mixture. Sulfonated poly(phenylene oxide) polymer can be further neutralized with an appropriate base and recovered. The sulfonic acid groups in the thus prepared sulfonated poly(phenylene oxide) are expected to be distributed more homogeneously as compared to heterogeneously sulfonated poly(phenylene oxide) polymer, i.e., as in U.S. Pat. No. 3,259,592. This sulfonated poly(phenylene oxide) polymer has preferably an intrinsic viscosity above about 0.52 dl/g, preferably above 0.55 dl/g, and ion exchange capacity between about 0.5 and about 3.7 meq/g of dry polymer in $H^+$ form, preferably between about 1.9 and 3.2 meq/g of dry polymer in $H^+$ form. Since the sulfonated poly(phenylene oxide) polymer in acid form can be unstable, it is preferably converted to a salt form or a salified form by neutralizing either partially or completely with at least one appropriate base. The appropriate base may be selected from alkaline metals, such as $Li^+$ $Na^+$ etc., alkaline earth metals, such as $Ca^{++}$, $Mg^{++}$, etc., transition metals, such as $Co^{++}$, $Cu^{++}$ and $Ag^+$, ammonia, and organic bases, such as primary, secondary, tertiary and quaternary amines. The sulfonated poly(phenylene oxide) polymer in $Li^+$ form is generally preferred due to its solubility in alcohols such as ethanol.

The homogeneously sulfonated poly(phenylene oxide) polymer in acid form or in salified form is very soluble in common solvents, such as alcohols, ketones, aprotic solvents and mixtures of these solvents with water that can be advantageously utilized in the preparation of composite membranes. Due to improved characteristic of the modified poly(phenylene oxide) polymer of this invention, composite membranes having enhanced selectivity, permeability and strength are produced easily and consistently through any of the known procedures, e.g., as shown in U.S. Pat. No. 4,467,001, incorporated herein by reference. For example, one procedure for forming composite membranes with the modified poly(phenylene oxide) polymer may include dissolving the modified poly(phenylene oxide) polymer in a solvent to form a solution and applying the solution to deposit a finished dry coating up to about 10,000 Angstroms, preferably below 2,000 Angstroms, on the exterior surface of a porous substrate. In some instances, deposition or adhesion of the modified poly(phenylene oxide) polymer on the surface of the porous substrate may be promoted by using surfactants and/or chemical treatments. The resulting composite membranes are generally characterized by a thin modified poly(phenylene oxide) polymer layer or coating superimposed on a porous substrate. The thin layer or coating determines the separation characteristics of the composite membranes, with the porous substrate providing physical support for the layer or coating.

If rigorous controls and care are not executed during the composite membrane manufacturing process, residual pores, pinholes, and other defects may occur that could impair final membrane performance. It is well known in the art that membrane post-treating techniques can be effectively utilized to seal these residual defects. The methods particularly useful for post-treating composite membranes are described in U.S. Pat. No. 4,767,422. If defects do occur in the separation layer of the composite sulfonated poly(phenylene oxide) membranes, they can be effectively sealed by post-treating the membranes with low concentrations of polyelectrolytes dissolved in water, e.g., polyethylene amine, etc. or nonpolyelectrolytes, e.g., siloxanes, particularly amino functional siloxanes, polyvinyltoluene, polyphosphazines, etc. dissolved in hydrocarbons. The optimal selection of post-treating material will be dependent on the specific nature of the fluid or the gas separation application.

Any porous substrate produced from inorganic or organic materials can be used to prepare the composite membranes. However, it is desirable to employ natural and synthetic polymers, including but not limited to polymer blends and alloys, thermoplastics and thermoset polymers, as the porous substrate. Typical polymers are substituted or unsubstituted polymers which are selected from polysulfones; poly(styrenes), including styrene-containing copolymers such as acrylonitrile-styrene copolymers, styrene-butadiene copolymers, and styrenevinylbenzylhalide copolymers; polycarbonates; cellulosic polymers, such as cellulose acetate, cellulose-acetate-butyrate, cellulose propionate, methyl cellulose, etc.; polyamides and polyimides; polyethers; poly(arylene oxides) such as poly(phenylene oxide); polyurethanes; polyesters (including polyarylates), such as poly(ethylene terephthalate), poly(alkyl methacrylates), poly(alkyl acrylates), etc.; polysulfides; polymers from monomers having alphaolefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl esters) such as poly(vinyl acetate) and poly(vinyl propionate); polyphosphazines; etc. The porous substrate may be in flat sheet form, tubular form, hollow fiber form or any other configuration. Those skilled in the art are aware of the many methods for forming a porous substrate into different configurations. For instance, the porous hollow fibers can be produced by the well-known techniques described in the Journal of Applied Polymer Science, Vol. 23, 1509–1523, 1979, "Composite Hollow Fiber Membranes" by I. Cabasso, et al., and "Research and Development of NS-1 and Related Polysulfone Hollow Fibers for Reverse Osmosis Desalination of Seawater" PB 248 666 prepared for the Office of Water Research and Technology, Contract No. 14-30-3165, U.S. Department of the Interior, July 1975, incorporated herein by reference. As described in these references, the porous polysulfone hollow fibers can be prepared by dry/wet spinning method from a ternary solution of commercially available polysulfone in a solvent/nonsolvent mixture. The well-known tube-in-tube jet technique may be used for the spinning procedure with water at about room temperature, being the outside quench medium for the fibers. The quench medium in the center bore of the fiber preferably is air. Quenching is followed by extensive washing to remove pore forming materials. Following the wash, the hollow fibers are dried at elevated temperature and water is removed by passing the hollow fibers through a hot air drying oven. The porous hollow fibers most suitable for preparation of composite membranes possess high levels of surface porosity.

In another aspect, the present invention provides a composite membrane wherein the above described gas separation layer of modified poly(phenylene oxide) polymer is formed or deposited on at least one thin layer having a high gas permeability which is formed on the porous substrate. This thin layer of high gas permeability, which is interposed between the substrate and the above gas separation layer is preferably made of a polymer having an oxygen permeation coefficient above $1 \times 10^{-8}$ cm$^3$/cm$^2$.cmHg.sec. Preparation of such multilayered membranes is described in U.S. Pat. No. 4,603,922; European Patent Application publication No. 0181850; and I&EC Research, 28, 742 (1989), "Analysis and Construction of Multilayer Composite Membranes for Separation of Gas Mixtures" by K. A. Lundy and I. Cabasso, which are herein incorporated by reference.

The modified poly(phenylene oxide) polymers of the present invention, especially the homogeneously prepared sulfonated poly(phenylene oxide) polymer, are useful for preparing composite membranes. Such composite membranes can be used in a variety of fluid separations, especially for gas separations including separation of hydrogen from hydrogen containing gases, $O_2/N_2$ separations, $CO_2/CH_4$ separations and separation of helium from helium containing gases. A fluid or gas mixture at elevated pressure is brought into contact with the membrane whereby one or more components of the mixture is allowed to selectively permeate through the membrane with the rest of the mixture withdrawn as a nonpermeate.

The following examples serve to illustrate the invention. They are presented for illustrative purposes and are not intended to be limiting.

EXAMPLE 1

Four hundred grams of commercial-grade poly(phenylene oxide) polymer in fine powder form having an intrinsic viscosity of 0.49 dl/g, which are available from General Electric Company, were refluxed with about two liters of methyl ethyl ketone under mechanical agitation to form a slurry. The slurry was then filtered, while still hot, through a coarse sintered glass filter, thereby recovering a partially purified polymer in solid form. The recovered polymer was washed with about one liter of fresh methyl ethyl ketone. The polymer was again refluxed, filtered and washed as indicated above to obtain a further purified polymer. The polymer was washed until the resulting filtrate was clear and colorless. The polymer was dried to a constant weight at about 80° C. in a vacuum oven. The polymer yield was about 78%. The recovered polymer was found to have an intrinsic viscosity of 0.59 dl/g while the combined filtrate (extracted portion) was found to have an intrinsic viscosity of about 0.34 dl/g.

EXAMPLE 2

Two hundred fifty grams of the commercial poly(phenylene oxide) polymer from General Electric Company in fine powder form were dissolved in about 2.5 liters of toluene at a temperature of about 60° C. The resulting solution was cooled to room temperature and then about 1.25 liters of methanol were added slowly to precipitate poly(phenylene oxide) polymer. During methanol addition, the solution was stirred continuously. The precipitated polymer was collected by filtration, washed with methanol and dried in a vacuum oven at a temperature of about 60° C. The fractionation procedure was repeated. The purified polymer yield was about 80% and intrinsic viscosity was 0.52 dl/g.

The number molecular weight (Mn), weight molecular weight (Mw), molecular weight distribution and intrinsic viscosity of commercial poly(phenylene oxide) polymer and purified poly(phenylene oxide) polymers of Examples 1 and 2 are summarized in Table I. The number average molecular weight, weight average molecular weight and molecular weight distribution of the polymer were determined by using gel permeation chromatography.

TABLE I

| Sample | Intrinsic Viscosity (dl/g) | Mn | Mw | Mw/Mn |
|---|---|---|---|---|
| Commercial poly(phenylene oxide) polymer | 0.49 | 15,000 | 58,000 | 3.9 |
| Purified poly(phenylene oxide) polymer of Example 1 | 0.59 | 40,000 | 71,000 | 1.8 |
| Purified poly(phenylene oxide) polymer of Example 2 | 0.52 | 27,000 | 65,000 | 2.4 |

As can be seen from Table I, the number average molecular weight, weight average molecular weight and intrinsic viscosity are all significantly increased through purification, particularly through the purification procedures employed in Example 1. The decreased ratio of Mw/Mn of purified poly(phenylene oxide) polymers of Examples 1 and 2 indicates that the molecular weight distribution has been significantly narrowed.

EXAMPLE 3

Four hundred grams of the purified poly(phenylene oxide) polymer were dissolved under nitrogen atmosphere in 2.25 liters of chloroform (pretreated with a calculated amount of chlorosulfonic acid to remove residual water present in chloroform)in a resin kettle equipped with high-speed stirrer. The solution was cooled to about −20° C. To this cooled solution, 77.8 ml of chlorosulfonic acid dissolved in 317 ml of chloroform were added in five-minute intervals. Throughout the addition, the temperature of the solution was kept at about −20° C. After the addition was complete, the temperature of the mixture was brought to 25° C. A rapid sulfonation took place with the formation of a smooth thin paste. The reaction mixture was stirred for one hour at 25° C. and then 2 liters of methanol were added to form a clear, yellow solution. This solution was subsequently mixed with about 101 grams of LiOH.$H_2O$ and 102 grams of LiCl dissolved in about 800 ml of methanol/water mixture (methanol/water volume ratio was 60/40). The resulting mixture was concentrated to near dryness by rotary evaporation under vacuum. The residue dissolved in about 600 ml of methanol and diluted with about 1.8 liters of water. The mixture was dialyzed (10,000 MWCO molecular weight cutoff). The polymer was recovered from the dialyzed solution by rotary evaporation under vacuum and further dried at about 70° C. to a constant weight. The homogeneously sulfonated polymer in $Li^+$ form had an intrinsic viscosity of about 0.59 dl/g measured in 0.05 M $LiClO_4$ dimethylformamide solution and an ion exchange capacity of about 2.14 milliequivalents/gram of dry polymer in $H^+$ form. The gas separation characteristics of this sulfonated polymer are summarized in Table II.

The permeability coefficients and gas separation factors of polymers were determined using flat sheet films. These films were prepared by casting solution of the polymer on a glass plate followed by air drying. The air-dried films were stripped from the glass plates and dried in a vacuum oven at 70° C. for one week. The dried films that were 1 to 3 mils thick were placed in a permeation cell. The downstream side of the cell was evacuated to about $2.0 \times 10^{-2}$ mmHg and the feed gas introduced from the upstream side. The pressure of the permeate gas on the downstream side was measured using an MKS-Barathon pressure transducer. The permeability coefficient P was calculated from the steady-state gas permeation rate according to the equation:

$$P = C \times V \times L \times \frac{\frac{dp}{dt}}{h}$$

$C$ = constant
$V$ = volume of collection receiver
$L$ = thickness of membrane
$h$ = upstream pressure
$\frac{dp}{dt}$ = slope of steady-state line The permeability coefficients are reported in Barrer units $10^{-10}$ scm$^3$·cm/cm$^2$·cmHg·sec.

The gas separation factor is defined as the ratio of respective gas permeability coefficients.

EXAMPLE 4

Commercial-grade poly(phenylene oxide) polymer having an intrinsic viscosity of about 0.49 dl/g from General Electric Company was heterogeneously sulfonated with chlorosulfonic acid essentially as described in Example 1 of U.S. Pat. No. 3,259,592. The heterogeneously sulfonated polymer was then neutralized with LiOH to convert to Li+ form and purified as described in Example 3. The recovered sulfonated polymer in Li+ form had an intrinsic viscosity (IV) of 0.54 dl/g and an ion exchange capacity (IEC) of 2.12 milliequivalents of dry polymer in H+ form.

The gas permeation characteristics of the sulfonated polymer, which are determined as indicated above, are summarized in Table II.

TABLE II

| Sulfonated poly(phenylene oxide) polymer | IV dl/g | IEC | Permeability (1) | | | Sep. Factor | |
|---|---|---|---|---|---|---|---|
| | | | P(He) | P(O$_2$) | P(N$_2$) | O$_2$/N$_2$ | He/N$_2$ |
| Example 3 | 0.59 | 2.14 | 49.1 | 4.36 | 0.67 | 6.5 | 73 |
| Example 4 | 0.54 | 2.12 | 36.3 | 3.46 | 0.55 | 6.3 | 67 |

(1) in Barrer units, measured at 30° C.

EXAMPLE 5

A number of sulfonated poly(phenylene oxide) polymers were prepared from poly(phenylene oxide) precursors purified as described in Examples 1 and 2 following the heterogeneous sulfonation procedure of Example 4. A comparative sample of commercial poly(phenylene oxide) polymer heterogeneously sulfonated was prepared as described above except that the sample was not purified according to the procedure described in Examples 1 and 2 but isolated as described in Example 1 of U.S. Pat. No. 3,259,592. The comparative sample had an intrinsic viscosity of only 0.43 dl/g.

The gas permeation characteristics, intrinsic viscosity and ion exchanging capacity of the sulfonated poly(phenylene oxide) polymers were measured and compared with the gas permeation characteristics, intrinsic viscosity and ion exchange capacity of the sulfonated poly(phenylene oxide) polymers prepared from commercial grade, low molecular weight poly(phenylene oxide) precursor. The results are summarized in Table III below.

TABLE III

| Heterogeneously Sulfonated poly(phenylene oxide) | IV dl/g | IEC | Permeability (1) | | | Sep. Factor | |
|---|---|---|---|---|---|---|---|
| | | | P(He) | P(O$_2$) | P(N$_2$) | O$_2$/N$_2$ | He/N$_2$ |
| Commercial | 0.43 | 2.21 | 30.2 | 2.33 | 0.36 | 6.6 | 85 |
| Purified as in Example 2 | 0.51 | 2.29 | 35.0 | 3.00 | 4.71 | 6.4 | 74 |
| Purified as in Example 1 | 0.55 | 2.29 | 49.9 | 4.00 | 0.59 | 6.8 | 83 |

(1) in Barrer units, measured at 30° C.

As shown in Table III, the sulfonated poly(phenylene oxide) polymers prepared from poly(phenylene oxide) polymer purified as described in Examples 1 or 2 exhibit improved permeation as compared to the sulfonated poly(phenylene oxide) polymers from commercial grade poly(phenylene oxide) polymer.

EXAMPLE 6

A composite hollow fiber membrane was prepared by coating polysulfone hollow fibers with a coating solution of the lithium form of sulfonated poly(phenylene oxide) polymer (SPPO-Li+ polymer) prepared essentially as described in Example 3. The coating solution of sulfonated poly(phenylene oxide) polymer was prepared by dissolving about 0.70 grams SPPO-Li+ polymer and about 0.007 grams of amine functional silicone fluid (Genesee Polymer Corp., GP-4) in 100 cc of Reagent Alcohol (Fisher Scientific, HPLC grade). The coating solution was then filtered through a 1.5 micron glass filter and placed within a coating vessel. Polysulfone hollow fibers, which were dried in a dryer oven, were coated by passing the fibers through the coating solution that was contained in the coating vessel at a speed of about 3.3 m/min and then passed through a dryer oven prior to being taken up on a winder. The coated polysulfone hollow fibers were used to build a hollow fiber separatory permeator that was tested for air separation utilizing compressed air at 1035 kPa and 23° C. The separation factor between oxygen and nitrogen was 7.0 and the permeation rate of oxygen was $8.2 \times 10^{-6}$ cm$^3$/cm$^2$·cmHg·sec.

Although the invention has been described in detail with reference to certain specific embodiments, those skilled in the art will recognize that there are other embodiments within the spirit and scope of the claims.

What is claimed is:

1. A process for separating at least one gas component from a gas mixture, said process comprising bringing said gas mixture into contact with a composite membrane at a pressure sufficient to permeate said at least one gas component from said gas mixture, said composite membrane comprising a porous substrate coated with modified poly(phenylene oxide) polymer, said modified poly(phenylene oxide) polymer being prepared with poly(phenylene oxide) precursor having a number average molecular weight above 25,000, said modified poly(phenylene oxide) polymer defined by having a chemical structure with at least 10% of the polymer backbone comprised of the following recurring unit:

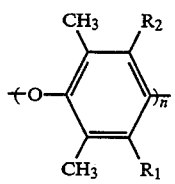

wherein $R_1$ and $R_2$ are selected from the group consisting of H, $SO_3H$, $SO_3M$, sulfonyl $SO_2R_3$, sulfonamide $SO_2N(R_3)_2$, carbonyl $COR_3$ and amide $CONHR_3$, with $R_3$ being a $C_1$ to $C_4$ aliphatic radical or aryl radical, and M being alkali metal, alkaline earth metal, transition metal, $NH^+_4$ or organic base, provided that at least one of $R_1$ and $R_2$ is not H.

2. A process for separating at least one fluid component from a fluid mixture, said process comprising: bringing said fluid mixture into contact with a membrane at a pressure sufficient to separate at least one fluid component from said fluid mixture, said membrane comprised of sulfonated poly(phenylene oxide) polymer which is prepared via a process comprising:
   (a) dissolving poly(phenylene oxide) polymer in an inert solvent to form a solution;
   (b) adding a sulfonation agent to said solution at a temperature sufficiently low to avoid any significant sulfonation reaction to form a substantially homogeneous reaction mixture;
   (c) raising the temperature of said substantially homogeneous reaction mixture to effect sulfonation of the dissolved poly(phenylene oxide) polymer and;
   (d) recovering the resulting sulfonated poly(phenylene oxide) polymer.

3. A composite membrane comprising at least one separation layer of modified poly(phenylene oxide) polymer on a porous substrate, said modified poly(phenylene oxide) polymer being prepared with poly(phenylene oxide) precursor having a number average molecular weight above 25,000, said modified poly(phenylene oxide) polymer defined by having a chemical structure with at least 10% of the polymer backbone comprised of the following recurring unit:

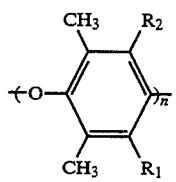

wherein: $R_1$ and $R_2$ are selected from the group consisting of H, $SO_3H$, $SO_3M$, sulfonyl $SO_2R_3$, sulfonamide $SO_2N(R_3)_2$, carbonyl $COR_3$ and amide $CONHR_3$, with $R_3$ being a $C_1$ to $C_4$ aliphatic radical or aryl radical, and M being alkaline metal, alkaline earth metal, transition metal, $NH^+_4$ or organic base, provided that at least one of $R_1$ and $R_2$ is not H.

4. The composite membrane according to claim 3, wherein said modified poly(phenylene oxide) polymer is prepared from poly(phenylene oxide) precursor having a number average molecular weight above 35,000.

5. The composite membrane according to claim 3, wherein the ratio of weight average molecular weight to number average molecular weight of poly(phenylene oxide) precursor is kept below 2.

6. The composite membrane according to claim 3, wherein said modified poly(phenylene oxide) polymer has an intrinsic viscosity above 0.52 dl/g.

7. The composite membrane according to claim 3, wherein said modified poly(phenylene oxide) polymer is selected from the group consisting of substituted poly(phenylene oxide) polymer and sulfonated poly(phenylene oxide) polymer.

8. The composite membrane according to claim 7, wherein said sulfonated poly(phenylene oxide) polymer has an ion exchange capacity of about 1.9 to 3.2 meq/g.

9. The composite membrane according to claim 7, wherein said sulfonated poly(phenylene oxide) polymer is at least partially neutralized or salified with at least one neutralizing or salifying means which is selected from the group consisting of $Li^+$, $Na^+$, $Ag^+$, $NH_4^+$ and an organofunctional amine.

10. The composite membrane according to claim 3, wherein said membrane is a composite hollow fiber membrane.

11. A membrane capable of separating at least one fluid component from a fluid mixture, said membrane comprising sulfonated poly(phenylene oxide) polymer which is prepared via a process comprising:
   (a) dissolving poly(phenylene oxide) polymer in an inert solvent to form a solution;
   (b) adding a sulfonation agent to said solution at a temperature sufficiently low to avoid any significant sulfonation reaction to form a substantially homogeneous reaction mixture;
   (c) raising the temperature of said substantially homogeneous reaction mixture to effect sulfonation of poly(phenylene oxide) polymer; and
   (d) recovering the resulting sulfonated poly(phenylene oxide) polymer.

12. The membrane according to claim 11, wherein said poly(phenylene oxide) polymer has a number average molecular weight above 25,000.

13. The membrane according to claim 12, wherein said poly(phenylene oxide) polymer having a number average molecular weight above 25,000 is prepared by a process comprising:
   (i) bringing poly(phenylene oxide) polymer containing low molecular weight fractions and/or polymerization catalyst in contact with solvent having a solubility parameter value of about 9.1 to about 9.7 $[cal/cm^3]^{\frac{1}{2}}$ to form a slurry;
   (ii) filtering said slurry to recover purified poly(phenylene oxide) polymer in solid form to remove low molecular weight fractions; and
   (iii) washing said purified poly(phenylene oxide) polymer in solid form with an inert solvent to remove additional low molecular weight fractions.

14. The membrane according to claim 11, wherein said sulfonated poly(phenylene oxide) is partially or completely neutralized with at least one neutralizing means selected from the group consisting of Li+, Na+, Ag+, NH4+ and an organofunctional amine.

15. The membrane according to claim 11, wherein said sulfonated poly(phenylene oxide) polymer is further purified by ultrafiltration, dialysis, or diafiltration to remove impurities and low molecular weight fractions.

16. The membrane according to claim 15, wherein the sulfonated poly(phenylene oxide) polymer is dialyzed or diafiltered in a membrane device with a molecular weight cutoff of 10,000.

17. The membrane according to claim 11, wherein said membrane is a composite hollow fiber membrane capable of separating at least one gas component from a gas mixture.

18. The membrane according to claim 11, wherein the sulfonation agent is chlorosulfonic acid.

19. The membrane according to claim 18, wherein said sulfonating agent is added at a temperature of about −20° C. or below to form said substantially homogeneous reaction mixture.

20. The membrane according to claim 19, wherein the sulfonation is carried out at a temperature of about 20° C. to about 25° C.

21. A process for making composite membranes comprising at least one Separation layer of modified poly(phenylene oxide) polymer on a porous substrate, with such polymer defined as having chemical structure with at least 10% of the polymer backbone comprised of the following recurring unit:

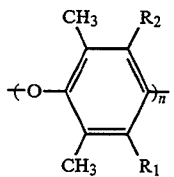

wherein $R_1$ and $RR_2$ are selected from the group consisting of H, $SO_3H$, $SO_3M$, sulfonyl $SO_2R_3$, sulfonamide $SO_2N(R_3)_2$, carbonyl $COR_3$ and amide $COHNR_3$, with $R_3$ being a $C_1$ to $C_4$ aliphatic radical or aryl radical, and M being alkali metal, alkaline earth metal, transition metal $NH^+_4$ or organic base, provided that at least one of $R_1$ and $R_2$ is not H, said process comprising:
(a) purifying poly(phenylene oxide) polymer to remove low molecular weight fractions;
(b) chemically modifying the purified poly(phenylene oxide) polymer to form said modified poly (phenylene oxide ) polymer;
(c) dissolving said modified poly(phenylene oxide) polymer in a solvent to form a solution; and
(d) coating said porous substrate with said solution.

22. The process according to claim 21, wherein said substrate is polysulfone hollow fibers.

23. The process according to claim wherein said purification of poly(phenylene oxide) in step (a) is carried out by:
(i) bringing poly(phenylene oxide) polymer containing low molecular weight fractions and/or polymerization catalyst in contact with solvent having a solubility parameter value of about 9.1 to about 9.7 $[cal/cm^3]^{\frac{1}{2}}$ to form a slurry;
(ii) filtering said slurry to recover purified poly(phenylene oxide) polymer in solid form and to remove low molecular weight fractions as the filtrate; and
(iii) washing said purified poly(phenylene oxide) polymer in solid form with an inert solvent to remove additional low molecular weight fractions.

24. A process for making composite membrane, said process comprising:
(a) dissolving modified poly(phenylene oxide) polymer in an inert solvent, said modified poly(phenylene oxide) polymer being defined as having a chemical structure with at least 10% of the polymer backbone comprised of the following recurring unit:

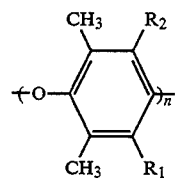

wherein: $R_1$ and $R_2$ are selected from the group consisting of H, $SO_3H$, $SO_3M$, sulfonyl $SO_2R_3$, sulfonamide $SO_2N(R_3)_2$, carbonyl $COR_3$ and amide $CONHR_3$, with $R_3$ being a $C_1$ to $C_4$ aliphatic radical or aryl radical, and M being alkali metal, alkaline earth metal, transition metal, $NH^+_4$ or organic base, provided that at least one of $R_1$ and $R_2$ is not H;
(b) subjecting the dissolved modified poly(phenylene oxide) polymer to ultrafiltration, diafiltration and/or dialysis to obtain purified modified poly(phenylene oxide)polymer;
(c) dissolving the purified modified poly(phenylene oxide) polymer in a solvent to form a coating solution; and
(d) coating a porous substrate with said coating solution.

25. A process for producing poly(phenylene oxide) polymer having a number average molecular weight above 25,000, said process comprising:
(i) bringing poly(phenylene oxide) polymer containing low molecular weight fractions and/or polymerization catalyst in contact with solvent having a solubility parameter value of about 9.1 to about 9.7 $[cal/cm^3]^{\frac{1}{2}}$ to form a slurry;
(ii) filtering said slurry to recover purified poly(phenylene oxide) polymer in solid form and to remove said low molecular weight fractions as the filtrate; and
(iii) washing said purified poly(phenylene oxide) polymer in solid form with an inert solvent to remove additional low molecular weight fractions.

26. The process according to claim 25, wherein said solvent is aliphatic ketone or ether.

27. The process according to claim 26, wherein the temperature of said aliphatic ketone or said ether is at about 70° C. or higher.

28. The process according to claim 27, wherein said aliphatic ketone is methyethyl ketone.

29. A process for preparing a membrane forming material capable of forming a membrane useful for separating at least one fluid component from a fluid mixture, said process comprising:
(a) dissolving poly(phenylene oxide) polymer in an inert solvent to form a solution;
(b) adding a sulfonation agent to said solution at a temperature sufficiently low to avoid any significant sulfonation reaction to form a substantially homogeneous reaction mixture;

(c) raising the temperature of said substantially homogeneous reaction mixture to effect sulfonation of the dissolved poly(phenylene oxide) polymer and;

(d) recovering the resulting sulfonated poly(phenylene oxide) polymer.

30. The process according to claim 29, further comprising purifying said poly(phenylene oxide) polymer before being dissolved in said inert solvent, said purifying comprising:

(i) bringing poly(phenylene oxide) polymer containing low molecular weight fractions and/or polymerization catalyst in contact with solvent having a solubility parameter value of about 9.1 to about 9.7 $[cal/cm^3]^{\frac{1}{2}}$ to form a slurry;

(ii) filtering said slurry to recover purified poly(phenylene oxide) polymer in solid form to remove low molecular weight fractions; and (iii) washing said purified poly(phenylene oxide) polymer in solid form with an inert solvent to remove additional low molecular weight fractions.

* * * * *

UNITED STATES PATENT AND TRADEMARK OFFICE
CERTIFICATE OF CORRECTION

PATENT NO. : 5,348,569

DATED : September 20, 1994

INVENTOR(S) : Benjamin Bikson, et al.

It is certified that error appears in the above-identified patent and that said Letters Patent is hereby corrected as shown below:

In column 7, line 15, insert commas after "$Li^+$" and before "$Na^+$" and also after "$Na^+$" and before "etc.,".

Column 15:
In claim 21, line 41, delete "$RR_2$" and insert therefor --$R_2$--.

In claim 21, line 43, delete "$COHNR_3$" and insert therefor --$CONHR_3$--.

In claim 21, line 46, insert a comma after "metal" and before "$NH_4^+$".

In claim 23, line 58, insert --21-- after "claim" and before "wherein".

Column 16;
In claim 28, line 58, delete "methyethyl" and insert therefore --methyl ethyl--.

Signed and Sealed this

Twenty-fourth Day of January, 1995

Attest:

BRUCE LEHMAN

Attesting Officer   Commissioner of Patents and Trademarks